United States Patent [19]
Tsutsumida

[11] Patent Number: 6,102,380
[45] Date of Patent: Aug. 15, 2000

[54] FLUID FILLED CYLINDRICAL ELASTIC MOUNT HAVING THREE EQUILIBRIUM CHAMBERS FOR DIFFERENT FREQUENCY BANDS

[75] Inventor: Jyoji Tsutsumida, Komaki, Japan

[73] Assignee: Tokai Rubber Industries, Ltd., Japan

[21] Appl. No.: 09/181,349

[22] Filed: Oct. 28, 1998

[30] Foreign Application Priority Data

Nov. 14, 1997 [JP] Japan ..................................... 9-313805

[51] Int. Cl.$^7$ ................................................. F16F 13/00
[52] U.S. Cl. ................................................. 267/140.12
[58] Field of Search ........................ 267/140.12, 140.11, 267/140.13, 141, 141.2, 219; 248/562, 636, 638

[56] References Cited

U.S. PATENT DOCUMENTS

| | | | |
|---|---|---|---|
| 4,884,789 | 12/1989 | Takeda et al. ...................... | 267/140.12 |
| 5,188,346 | 2/1993 | Hamada et al. .................... | 267/140.12 |
| 5,370,376 | 12/1994 | Ishiyama ............................ | 267/140.12 |
| 5,547,173 | 8/1996 | Tsutsumida et al. .............. | 267/140.15 |

FOREIGN PATENT DOCUMENTS

| | | |
|---|---|---|
| 4-95631 | 3/1992 | Japan . |
| 6-22641 | 3/1994 | Japan . |
| 7-99186 | 10/1995 | Japan . |

*Primary Examiner*—Robert J. Oberleitner
*Assistant Examiner*—Mariano Sy
*Attorney, Agent, or Firm*—Wall Marjama Bilinski & Burr

[57] ABSTRACT

A fluid-filled cylindrical elastic mount comprising: a center shaft member; an intermediate sleeve disposed radially outwardly of the center shaft member; an elastic body interposed between and connecting the center shaft member and the intermediate sleeve; and an outer sleeve member disposed on the intermediate sleeve; an orifice member interposed between the intermediate sleeve and the outer sleeve member to divide a first pocket formed in the elastic body into a pressure-receiving chamber and a first equilibrium chamber partially defined by a first flexible diaphragm, to close a second and third pocket diametrically opposite to the first pocket, to provide a second equilibrium chamber having a spring stiffness smaller than that of the first equilibrium chamber and a third equilibrium chamber having a spring stiffness larger than that of the first equilibrium chamber, and to partially define a first, second and third orifice passages for communication of the respective first, second and third equilibrium chambers with the pressure-receiving chamber, and wherein the elastic body has an axial void to provide a second and third flexible diaphragm which partially define the respective second and third equilibrium chambers, and the first orifice passage has a ratio of a cross sectional area to a circumferential length higher than that of the second orifice passage, and lower than that of the third orifice passage.

11 Claims, 8 Drawing Sheets

FLUID FILLED CYLINDRICAL ELASTIC MOUNT HAVING THREE EQUILIBRIUM CHAMBERS FOR DIFFERENT FREQUENCY BANDS

This application is based on Japanese Patent Application No. 9-313805 filed on Nov. 14, 1997, the content of which is incorporated hereinto by reference.

BACKGROUND OF THE INVENTION

1. Field of the Invention

The present invention relates in general to a fluid-filled elastic mount which exhibits a vibration damping or isolating effect based on flows or resonance of a non-compressible fluid such as water contained therein, and more particularly to such a mount which has three orifice passages tuned to respective different frequency bands of input vibrations and exhibits an excellent vibration damping or isolating effect with respect to the input vibrations over a wide frequency range, based on the flows of the non-compressible fluid through these orifice passages.

2. Discussion of the Related Art

As one type of a vibration damping elastic bushing or mount interposed between two members of a vibration system, there is known a fluid-filled cylindrical elastic mount comprising: a metal shaft; an outer sleeve disposed radially outwardly of the metal shaft with a predetermined radial spacing therebetween, such that these two members are co-axial or eccentric with respect to each other; an elastic body interposed between the metal shaft and the outer sleeve for elastically connecting the metal shaft and the outer sleeve, and partially defining a pressure-receiving chamber; a flexible diaphragm partially defining an equilibrium chamber opposed to the pressure-receiving chamber in the diametrical direction of the mount; and means for defining an orifice passage connecting between the pressure-receiving chamber and the equilibrium chamber. The pressure-receiving and equilibrium chambers are filled with a non-compressible fluid. Upon application of vibrations to the mount, the pressure of the fluid in the pressure receiving chamber changes due to deformation of the elastic body, and the volume of the equilibrium chamber changes due to deformation of the flexible diaphragm. The fluid-filled cylindrical elastic mount of this type is capable of exhibiting an excellent vibration damping or isolating effect based on the flows or resonance of the fluid, which is forced to flow through the orifice passage upon application of the vibrations between the metal shaft and the outer sleeve, and is preferably usable as an engine mount for a motor vehicle, for example.

Generally, the above indicated vibration damping or isolating effect of the mount based on the flows or resonance of the fluid is exhibited with respect to only the particular input vibrations over a limited frequency range to which the orifice passage is tuned. However, some engine mounts for the vehicle are required to damp or isolate the input vibrations over a wide frequency range, since the frequency of the input vibrations to be damped or isolated changes depending upon the driving condition of the vehicle. For instance, the engine mount is required to exhibit a high vibration damping effect with respect to low-frequency vibrations of 10 Hz, such as an engine shake, and to exhibit a high vibration isolating effect owing to a low spring constant with respect to medium-frequency vibrations of 20 Hz–40 Hz, such as an engine idling vibration and high-frequency vibrations of 50 Hz–80 Hz such as a booming noise and a high harmonics of the engine idling vibration.

In view of the above indicated requirements, there is proposed a mount structure comprising two orifice passages independent of each other, and two equilibrium chambers independent of each other and connected to the pressure receiving chamber through the respective orifice passages, as disclosed in JP-B-7-99186, JP-A-4-95631 and JPU-6-22641. Based on the resonance of the fluid flowing through the two orifice passages, this mount structure can exhibit a vibration damping or isolating effect with respect to the input vibrations over two different frequency bands to which the two orifice passages are respectively tuned. However, even in the mount structure constructed as described above, the intended vibration damping or isolating operation is effective only to the input vibrations over the two different frequency bands to which the two orifice passages are respectively tuned. Accordingly, there has been a demand for an engine mount which exhibits an excellent vibration damping or isolating effect based on the flows or the resonance of the fluid with respect to the input vibrations over a sufficiently wide frequency range.

It is considered possible to provide the desired engine mount by simply adding one more equilibrium chamber and one more orifice passage to the mount structure disclosed in JP-B-7-99186 and the other publications identified above. Namely, the engine mount includes three independent equilibrium chambers and three independent orifice passages connected to the respective equilibrium chambers, so that the engine mount exhibits the vibration damping or isolating effect with respect to the input vibrations over a wider frequency range, based on the flows of the fluid through the three orifice passages. However, this engine mount does not exhibit the sufficient vibration damping or isolating effect based on the flows of the fluid through the orifice passages, unless the equilibrium chambers of the engine mount permit sufficient amounts of change in their volumes. In this respect, there is a technical difficulty of arranging the three equilibrium chambers in the interior space of the mount, which is limited by the size of the mount, while assuring that the three equilibrium chambers have the desired volumes. Thus, a practically satisfactory mount structure having three equilibrium chambers has not still been developed.

SUMMARY OF THE INVENTION

It is therefore an object of the present invention to provide a fluid-filled cylindrical elastic mount having three orifice passages which are respectively tuned to a low-, medium- and high-frequency band, and three equilibrium chambers which are connected to a pressure receiving chamber through these three orifice passages, respectively, wherein these three equilibrium chambers are disposed in the limited interior space of the mount with effective space utilization, while permitting desired amounts of change in their volumes for sufficient flows of the fluid through these orifice passages, so that, the fluid-filled cylindrical elastic mount is capable of exhibiting an excellent vibration damping or isolating effect with respect to the input vibrations over the respective three different frequency bands, based on the flows of the fluid through these three orifice passages.

The above object of the invention may be attained according to the principle of the present invention, which provides a fluid-filled cylindrical elastic mount interposed between two members of a vibration system, comprising: (a) a center shaft member attached to one of the two members of said vibration system; (b) an intermediate sleeve disposed radially outwardly of the center shaft member with a predetermined radial spacing therebetween and having a first window, a second window smaller than the first window and a third window smaller than the second windows, the first, second and third windows being spaced apart from one another in a circumferential direction of the intermediate sleeve; (c) an elastic body interposed between and elastically connecting the center shaft member and the intermediate sleeve, the elastic body having a first pocket, a second pocket and a third pocket which are open in an outer circumferential surface of the intermediate sleeve through the first, second and third windows of the intermediate sleeve, respectively, the first pocket being located in one of two diametrically opposed circumferential portions of the mount while the second and third pockets being located in the other circumferential portion; (d) an outer sleeve member radially outwardly disposed on and fixed to the intermediate sleeve, and being attached to the other member of the vibration system; (e) a first flexible diaphragm closing the first pocket; (f) the elastic body having an axial void which is formed through a portion of the elastic body between the center shaft member and the second and third pockets, over an entire axial length of the elastic body and in a circumferential direction of the elastic body with a circumferential length of about a half of a circumference of the elastic body, such that a major portion of the elastic body is located in the one circumferential portion of the mount, and such that bottom wall portions of the second and third pockets respectively provide a second flexible diaphragm having a spring stiffness value smaller than that of the first flexible diaphragm, and a third flexible diaphragm having a spring stiffness value larger than that of the first flexible diaphragm; (g) a generally cylindrical orifice member interposed between the intermediate sleeve and the outer sleeve member and including a first circumferential portion which divides the first pocket into a radially inner a pressure-receiving chamber partially defined by the elastic body and a radially outer first equilibrium chamber partially defined by the first flexible diaphragm, the orifice member further including a second circumferential portion closing the second pocket so as to provide a second equilibrium chamber partially defined by the second flexible diaphragm, and a third circumferential portion closing the third pocket so as to provide a third equilibrium chamber partially defined by the third flexible diaphragm, the orifice member cooperating with the outer sleeve member to define a first orifice passage for fluid communication between the pressure-receiving chamber and the first equilibrium chamber, a second orifice passage for fluid communication between the pressure-receiving chamber and the second equilibrium chamber and a third orifice passage for fluid communication between the pressure-receiving chamber and the third equilibrium chamber, a ratio of a cross sectional area to a circumferential length of the second orifice passage being lower than that of the first orifice passage, and a ratio of a cross sectional area to a circumferential length of the third orifice passage being higher than that of the first orifice passage; and (h) a non-compressible fluid filling the pressure-receiving chamber and the first, second and third equilibrium chambers.

The fluid-filled cylindrical elastic mount constructed according to the present invention exhibits an excellent vibration isolating effect with respect to the input vibrations within a medium-frequency band, owing to the resonance of the fluid flowing between the pressure receiving-chamber and the first equilibrium chamber through the first orifice passage, while exhibiting an excellent vibration damping effect with respect to the input vibrations within a low-frequency band, owing to the resonance of the fluid flowing between the pressure receiving-chamber and the second equilibrium chamber through the second orifice passage.

Further, the fluid-filled cylindrical elastic mount exhibits an excellent vibration isolating effect with respect to the input vibrations within a high-frequency band, owing to the resonance of the fluid flowing between the pressure receiving chamber and the third equilibrium chamber through the third orifice passage. In this respect, the second equilibrium chamber contributing to the low-frequency vibration damping and the third equilibrium chamber contributing to the high-frequency vibration isolation are disposed in one of the two diametrically opposed circumferential portions of the mount while the pressure-receiving chamber is formed in the other circumferential portion, such that the second and third equilibrium chambers are located in a space which is radially outward of the axial void, and are spaced apart from each other in the circumferential direction of the mount. Namely, the second equilibrium chamber is required to permit a relatively large amount of change in its volume, since an amplitude of the low-frequency vibration is relatively large, so that a relatively large space is required to form the second equilibrium chamber. On the other hand, the third equilibrium chamber is required to permit a relatively small amount of change in its volume, since an amplitude of the high-frequency vibration is considerably small, so that a relatively small space is required to form the third equilibrium chamber. Thus, the most of the space radially outward of the axial void can be used to form the second equilibrium chamber. Moreover, the first equilibrium chamber contributing to the medium-frequency vibration isolation is formed in a space radially outward of the pressure-receiving chamber which is opposed to the second and third equilibrium chambers in the diametric direction of the mount. Thus, the first equilibrium chamber can be formed without restricting the spaces that can be suitably used for the second and their equilibrium chambers, and vice versa. The medium-frequency vibration has an amplitude larger than that of the high-frequency vibration, and smaller than that of the low-frequency vibration, so that the first equilibrium chamber permit a sufficient amount of change in its volume required for isolating the medium-frequency vibration, even though the first equilibrium chamber is provided in the space which is limited by the pressure-receiving chamber and the elastic body.

That is, in the fluid-filled cylindrical elastic mount constructed according to the present invention, the first, second and third equilibrium chambers are arranged in an unique form as described above, which first, second and third equilibrium chambers are connected to the respective first, second and third orifice passages which are respectively tuned to the medium-, low- and high-frequency bands. This arrangement permits the first, second and third equilibrium chambers to have the respective amounts of change in their volumes which are required for assuring sufficient flows of the fluid through the first, second and third orifice passages, resulting in excellent vibration damping and isolating effects exhibited by the mount with respect to the low-, medium- and high-frequency vibrations, based on the resonance of the fluid flowing through the respective first, second and third orifice passages tuned to the medium-, low- and high-frequency ranges, respectively.

In the present fluid-filled cylindrical elastic mount, the first flexible diaphragm partially defining the first equilibrium chamber has the spring stiffness value which is larger than that of the second equilibrium chamber. Namely, the amount of change in the volume of the second equilibrium chamber per unit amount of pressure change in the pressure-receiving chamber is sufficiently larger than that of the first equilibrium chamber. In this arrangement, the increase of the fluid pressure in the pressure-receiving chamber due to the elastic deformation of the pressure-receiving chamber is effectively absorbed by the increase of volume of the second equilibrium chamber, under the operating condition of the engine mount in which the weight of the vehicle power unit, for example, is applied between the center shaft member and the outer sleeve member. Accordingly, deterioration of the vibration damping effect of the mount due to the increase of the pressure of the pressure-receiving chamber or unfavorable deformation of the first flexible diaphragm are effectively prevented, leading to increased stability of the vibration damping and isolating function of the mount, and improved durability of the mount.

In addition, the orifice member of the present mount facilitates the formation of the first, second and third orifice passages with a reduced number of the required components and a simple structure, and permits the orifice passages to have desired circumferential lengths, in particular, permits a sufficiently large-length of the second orifice passage which is tuned to the low-frequency vibrations, resulting in a further improved vibration damping effect based on the resonance of the fluid flowing through the second orifice passage.

The pressure-receiving chamber and the axial void are opposed to each other in the diametric direction parallel to a primary load receiving direction, so that a tensile stress acting on the elastic body upon installation of the present cylindrical mount in the vibration system is reduced or prevented. The axial void divides the mount into two circumferential portions which are opposite to each other in the primary load receiving direction. It is also appreciated that the first equilibrium chamber is formed in one of the two diametrically opposed semi-cylindrical circumferential portions while the second and third equilibrium chambers are formed in the other semi-cylindrical circumferential portion. It is desirable that the first orifice passage has a circumferential length which is smaller than that of the second orifice passage and is larger than that of the third orifice passage, so that these orifice passages exhibits the desired vibration damping and isolating effects. More precisely, the second orifice passage is desired to have a circumferential length larger than the outer circumference of the orifice member. The orifice member may have rectangular grooves formed in its outer circumferential surface so as to generally extend in its circumferential direction such that the openings of the rectangular grooves are closed by the outer sleeve member, for example, to provide the first, second and third orifice passages. These orifice passages may have a hole portion formed through a circumferential portion of the orifice member which separates the first equilibrium chamber from the pressure-receiving chamber. The first flexible diaphragm is disposed at any position provided it fluid-tightly closes the opening of the first pocket of the elastic body. For instance, the first flexible diaphragm may be bonded at its outer periphery to the intermediate sleeve or the outer sleeve member, or may be compressed at its outer peripheral portion by and between the intermediate sleeve and the outer sleeve member.

According to a first preferred form of the present invention, the fluid-filled cylindrical elastic mount further comprises a sealing rubber layer which is bonded to an inner circumferential surface of said outer sleeve member, and compressed by and between the outer sleeve member and the intermediate sleeve. The sealing rubber layer includes a portion aligned with the first window and spaced apart from the outer sleeve member in a radially inward direction of the mount, so as to provide the first flexible diaphragm.

In the above first preferred form of the fluid-filled cylindrical elastic mount, the sealing rubber layer assures the fluid-tightness of the mount, while a part of the sealing rubber layer functions as the first flexible diaphragm, thereby assuring a reduced number of the required components and a simple structure of the mount. For facilitating the formation of the first flexible diaphragm consisting of the part of the sealing rubber layer, the outer sleeve may have a through-hole at a local portion thereof which is adjacent to the first flexible diaphragm. The first flexible diaphragm is exposed to the atmosphere through the through-hole. The first flexible diaphragm can be formed as a single component independent of the elastic body.

According to a second preferred form of the present invention, the second and third pockets have respective axially opposite side wall portions which are easily elastically deformable and which partially define the second and third flexible diaphragms, respectively. The second and third flexible diaphragms consisting of the bottom wall portions and the axially opposite side wall portions of the respective second and third pockets.

In the above second preferred form of the fluid-filled cylindrical elastic mount, the second and third flexible diaphragms can have a sufficiently wide area, and accordingly permit the sufficient amounts of change in their volumes with high stability, resulting in further improved vibration damping and isolating effects of the mount, owing to the resonance of the fluid flowing through the second and third orifice passages.

According to a third preferred form of the present invention, the fluid-filled cylindrical elastic mount further comprises a restricting mass member embedded in a portion of the elastic body, which partially defines the first pocket.

In the above third preferred form of the fluid-filled cylindrical elastic mount, the restricting mass member and the part of the elastic body which partially define the first pocket and in which the restricting mass member is elastically supported, provide a vibration system. This vibration system may exhibit a vibration isolating effect based on the resonance of the restricting mass member and the above identified portion of the elastic body with respect to the input vibrations within the specific frequency band to which the natural frequency of the vibration system is tuned. The natural frequency of the vibration system can be adjusted by changing the mass of the restricting mass member and the spring characteristic of the above-indicated portion of the elastic body defining the first pocket. The vibration system may be used to isolate the input vibrations in the frequency band higher than the resonance frequency of the fluid flowing through the third orifice passage, whereby the present mount can exhibit an excellent vibration isolating effect with respect to the input vibrations in the frequency band higher than the high-frequency band to which the third orifice passage is tuned.

According to a fourth preferred form of the present invention, the first flexible diaphragm has a surface area which is smaller than that of the second flexible diaphragm and is larger than that of the third flexible diaphragm.

In the above fourth preferred form of the fluid-filled cylindrical elastic mount, each of the first, second and third equilibrium chambers efficiently permits the required amount of change in its volume corresponding to the frequency band of the vibrations to be damped or isolated, although the equilibrium chamber is provided within the corresponding limited space in the mount. Accordingly, the first, second and third orifice passages can exhibit desired vibration damping and isolating effects with high stability, owing to the resonance of the fluid flowing through these orifice passages.

BRIEF DESCRIPTION OF THE DRAWINGS

The above and other objects, features and advantageous of the present invention will be better understood by reading the following detailed description of one presently preferred embodiment of the invention, when considered in connection with the accompanied drawings, in which.

DETAILED DESCRIPTION OF PREFERRED EMBODIMENT

Figure 1:
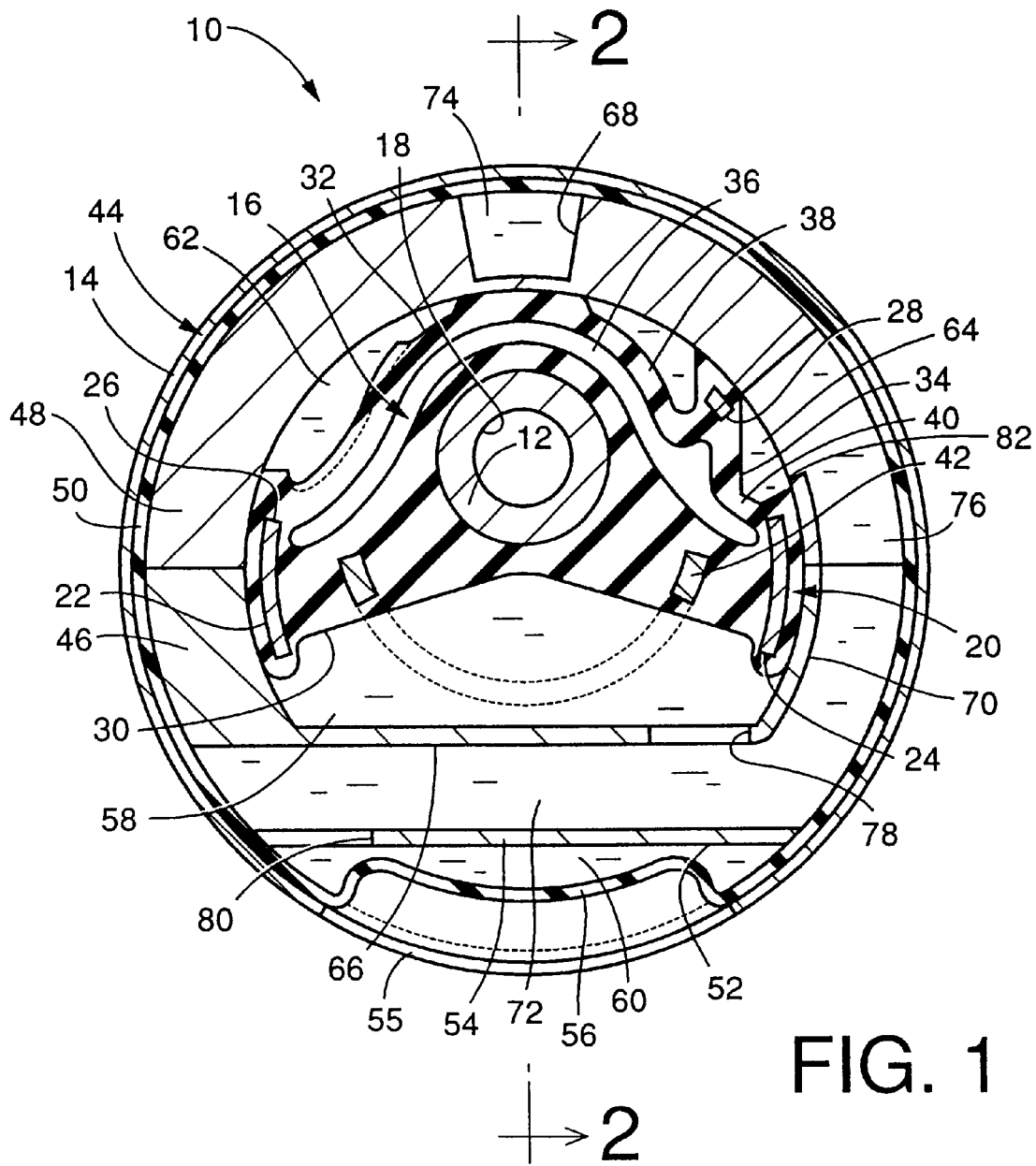
FIG. 1 is an elevational view in transverse cross section of an engine mount for an automotive vehicle, which is constructed according to one embodiment of the present invention.
Figure 2:
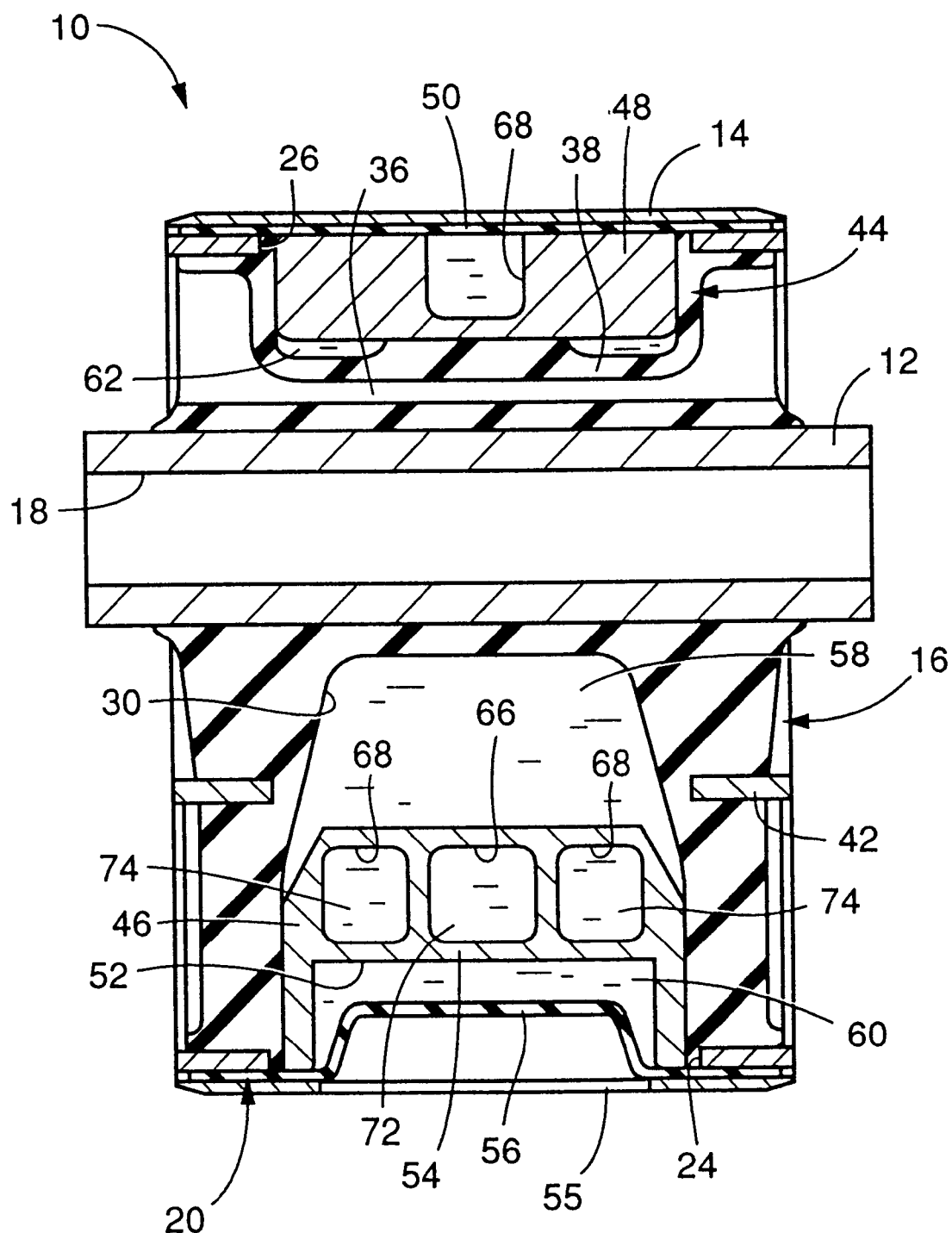
FIG. 2 is an elevational view in axial cross section taken along line 2—2 of FIG. 1.
Figure 3:
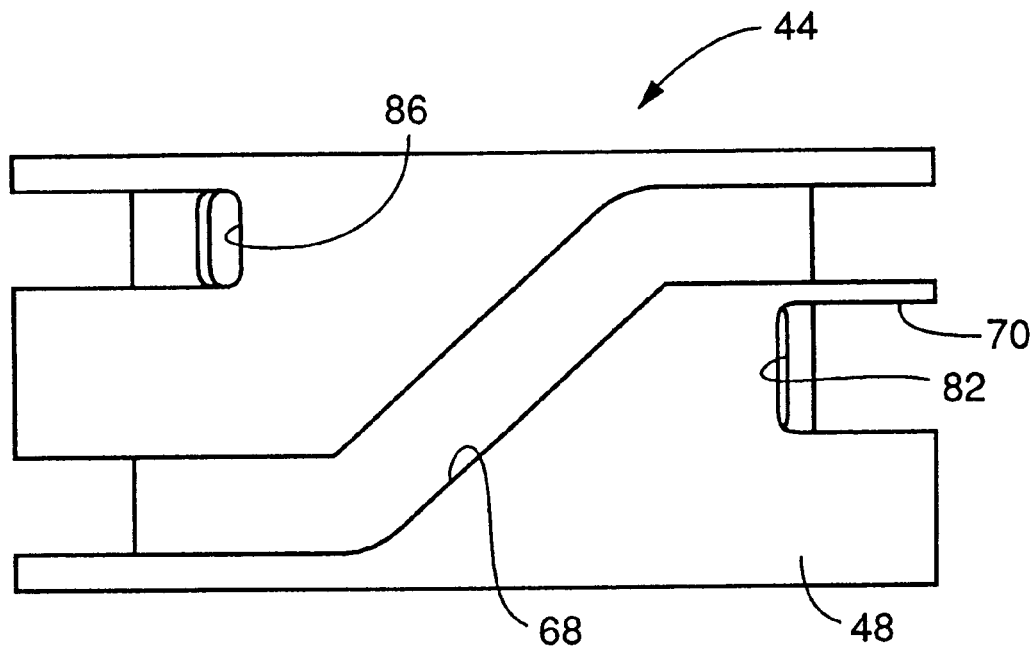
FIG. 3 is a top plane view of an orifice member of the engine mount of FIG. 1.
Figure 4:
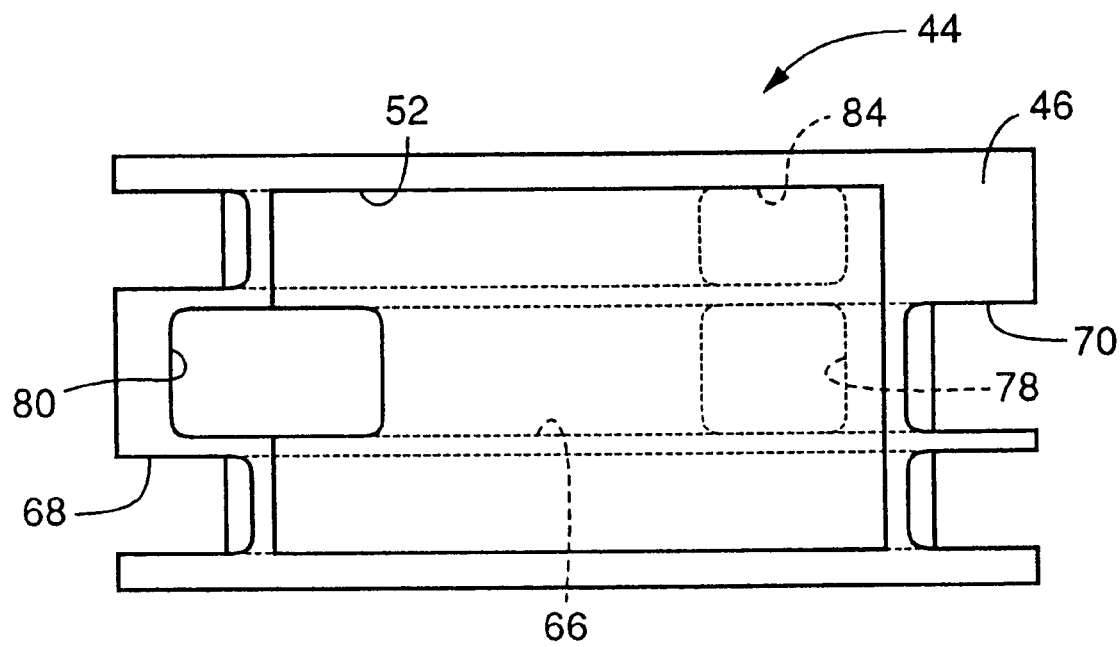
FIG. 4 is a bottom plane view of the orifice member of FIG. 3.

Referring first to FIGS. 1 and 2, there is shown one embodiment of a fluid-filled elastic cylindrical mount of this invention in the form of an engine mount 10 for an automotive vehicle. This engine mount 10 includes a center shaft member in the form of an inner sleeve 12 and an outer sleeve 14 disposed radially outwardly of the inner sleeve 12 with a predetermined radial spacing therebetween. Each of these inner and outer sleeves 12, 14 is made of a metallic material. The axis or center of the inner sleeve 12 is radially offset from that of the outer sleeve 14 by a slight radial distance. The inner and outer sleeves 12, 14 are elastically connected with each other by an elastic body 16 interposed therebetween. The engine mount 10 is installed on the vehicle such that the inner and outer sleeve 12, 14 are attached to a power unit and a body of the vehicle, respectively, so that the power unit is supported by the vehicle body via the engine mount 10 in a vibration damping or isolating fashion. When the engine mount 10 is installed on the vehicle as described above, a static load or weight of the power unit acts on the inner sleeve 12, with a result of elastic deformation of the elastic body 16 so that the inner sleeve 12 is brought into a substantially coaxial or concentric relationship with the outer sleeve 14. The engine mount 10 is adapted to damp or isolate primarily a vibrational load applied in a direction (in the vertical direction as seen in FIG. 1) in which the inner sleeve 12 and the outer sleeve 14 are offset from each other prior to the installation of the engine mount 10 on the vehicle. This diametric direction will be referred to as "a load-receiving direction" where appropriate.

Described more specifically, the inner sleeve 12 is a cylindrical hollow member made of a metallic material, and having a relatively small diameter and a relatively large wall thickness. The inner sleeve 12 has a bore 18 through which a fixing rod is inserted for fixing the inner sleeve 12 to the power unit (not shown). The engine mount 10 further includes an intermediate sleeve 20 consisting of a generally cylindrical member made of a metallic material and having a relatively large diameter and a relatively small wall thickness. Before installation of the engine mount, the intermediate sleeve 20 is disposed radially outwardly of the inner sleeve 12 with a predetermined radial spacing therebetween, while being radially offset with respect to the inner sleeve 12 by a slight radial distance. The intermediate sleeve 20 is radially inwardly recessed at an axially intermediate portion so as to provide an annular recess 22 having a relatively large axial dimension. The intermediate sleeve 20 is formed with a first window 24, a second window 26 and a third window 28, such that these windows 24, 26, 28 are spaced apart from one another in the circumferential direction of the intermediate sleeve 20, and have an axial length which is larger than that of the annular recess 22. The first window 24 has a circumferential length which is almost equal to or slightly smaller than a half of the outer circumference of the annular recess 22, e.g., a circumferential length of about two-fifths (⅖) of the outer circumference of the annular recess 22. The second window 26 has a circumferential length which is slightly smaller than that of the first window 24, e.g., a circumferential length of about one-third (⅓) of the outer circumference of the annular recess 22. The third window 28 has a circumferential length which is considerably smaller than that of the first and second windows 24, 26, e.g., a circumferential length of about one-tenths (¹⁄₁₀) of the outer circumference of the annular recess 22. The first window 24 is located in a lower one of the two diametrically opposite circumferential portions of the engine mount 10 at which the radial distance between the inner sleeve 12 and the intermediate sleeve 20 is larger in the offset direction of the inner and intermediate sleeves 12, 20 of FIG. 1, while the second and third windows 26, 28 are located in an upper one of the two diametrically opposite circumferential portions at which the radial distance between the inner and intermediate sleeves 12, 20 is smaller in the offset direction.

The elastic body 16 interposed between the inner and intermediate sleeves 12, 20 has a generally annular shape and a relatively large wall thickness. The elastic body 16 is bonded at its inner circumferential surface to the inner sleeve 12 and at its outer circumferential surface to the intermediate sleeves 20 by vulcanization of a rubber material to form the elastic body 16, so that these three members 12, 16, 20 are formed as an integral structure. The elastic body 16 has at its axially middle portion a first pocket 30, a second pocket 32 and a third pocket 34 formed at respective circumferential portions thereof. The first pocket 30 is opposed to the second and third pockets 32, 34 in the diametrical direction of the engine mount 10 in which the inner and intermediate sleeves 12, 20 are offset from each other. More specifically described, the first pocket 30 is located in the above indicated lower circumferential portion at which the radial distance between the inner sleeve 12 and the intermediate sleeve 20 is larger in the offset direction of the inner and intermediate sleeves 12, 20, while the second and third pockets 32, 34 are located in the above indicated upper circumferential portion at which the radial distance between the inner and intermediate sleeves 12, 20 is smaller in the offset direction. The second and third pockets 32, 34 are spaced apart from each other in the circumferential direction of the elastic body 16 with a predetermined circumferential distance therebetween. The first, second and third pockets 30, 32, 34 are open in an outer circumferential surface of the intermediate sleeve 20 through the first, second and third windows 24, 26, 28, respectively.

The elastic body 16 has an axial void 36 formed therethrough over its entire axial length, between the inner sleeve 12 and the second and third pockets 32, 34, so as to extend in its circumferential direction with a circumferential length substantially equal to a half of its circumference. In the presence of the axial void 36, one part of the elastic body 16 which is located in the upper circumferential portion of the mount is divided at its radially middle portion into two radial parts one of which is bonded to the inner sleeve 12, and the other of which is not bonded to the inner sleeve 12. In this arrangement, the inner sleeve 12 is substantially elastically connected with the intermediate sleeve 20 by only the other part of the elastic body which is located in the lower circumferential portion of the engine mount 10, at which the radial distance between the two sleeves 12, 20 is larger. The provision of the axial void 36 provides the bottom wall portions of the second and third pockets 32, 34 which have a relatively small wall thickness and are easily elastically deformable. As shown in FIG. 2, each of the second and third pockets 32, 34 has axially opposite side wall portions which also have a relatively small wall thickness and are easily elastically deformable. The bottom and opposite side wall portions of the second and third pockets 32, 34 provide a second elastic layer 38 and a third elastic layer 40, respectively. That is, the second and third pockets 32, 34 are defined by respective second and third flexible diaphragms in the form of the easily deformable second and third elastic layers 38, 40.

In a radially intermediate part of the circumferential portion of the elastic body 16 in which the first pocket 30 is formed, there is embedded and bonded by vulcanization a part-cylindrical restricting member 42 made of a metallic material and having a large window corresponding to the first pocket 30.

The integral structure consisting of the inner sleeve 12, the elastic body 16, the intermediate sleeve 20 and the restricting member 42 is assembled with an orifice member 44 in the form of an annular or cylindrical member and the outer sleeve 14. The orifice member 44 is disposed on the outer circumferential surface of the intermediate sleeve 20, while the outer sleeve 14 is disposed on the outer circumferential surface of the orifice member 44. As is apparent from FIGS. 3–6, the orifice member 44 consists of a first generally semi-cylindrical member 46 and a second semi-cylindrical member 48. The first and second semi-cylindrical members 46, 48 are assembled with the integral structure 12, 16, 20, 42 such that the first and the second semi-cylindrical members 46, 48 are fitted into the respective circumferential portions of the annular recess 22 of the intermediate sleeve 20, and such that the first and second members 46, 48 are butted together at their circumferential end faces so as to form the cylindrical orifice member 44. The thus assembled cylindrical orifice member 44 closes the first, second and third windows 24, 26 and 28 formed in the intermediate sleeve 20.

The outer sleeve 14 is a cylindrical member having a relatively large diameter and a relatively small wall thickness. The outer sleeve 14 is disposed on and fixed to the outer circumferential surfaces of the intermediate sleeve and the orifice member 44 by a suitable drawing operation, such that the orifice member 44 is fixedly interposed between the intermediate sleeve 20 and the outer sleeve 14. To the entire area of the inner circumferential surface of the outer sleeve 14, there is bonded by vulcanization a thin sealing rubber layer 50. The sealing rubber layer 50 is compressed by and between the outer sleeve 14, and the intermediate sleeve 20 and the orifice member 44, so as to assure fluid-tightness therebetween.

With the orifice member 44 and the outer sleeve 14 fixed to the integral structure 12, 16, 20, 42 the openings of the first, second and third pockets 30, 32, 34 are fluid-tightly closed by the orifice member 44 and the outer sleeve 14. The first generally semi-cylindrical member 46 is radially inwardly recessed at its axially and circumferentially intermediate portion so as to provide a recessed portion 52 having a plane bottom wall 54. The recessed portion 52 of the first generally semi-cylindrical member 46 is fluid-tightly received within the first pocket 30 of the elastic body 16 so that the first pocket 30 is divided by the bottom wall 54 of the recessed portion 52 into a radially inward portion located adjacent to the bottom wall of the first pocket 30 and a radially outward portion located adjacent to the outer sleeve 14. The outer sleeve 14 has a through-hole 55 adjacent to the opening of the recessed portion 52. A circumferential portion of the sealing rubber layer 50 located adjacent to the through-hole 55 of the outer sleeve 14 is radially inwardly recessed so as to provide a first flexible diaphragm in the form of a first elastic layer 56 which is easily deformable.

In this arrangement, the first pocket 30 provides a pressure-receiving chamber 58 partially defined by the elastic body 16 and a first equilibrium chamber 60 partially defined by the first elastic layer 56, such that these chambers 58, 60 are located on the opposite sides of the bottom wall 54. The second and third pockets 32, 34 closed by the second semi-cylindrical member 48 provide a second equilibrium chamber 62 partially defined by the second elastic layer 38 and a third equilibrium chamber 64 partially defined by the third elastic layer 40, respectively. The pressure-receiving chamber 58 and the first, second and third equilibrium chambers 60, 62, 64 are filled with a suitable non-compressible fluid such as water, alkylene glycol, polyalkylene glycol or silicone oil. Upon application of a vibrational load between the inner sleeve 12 and the outer sleeve 14, a pressure of the fluid in the pressure-receiving chamber 58 changes based on elastic deformation of the elastic body 16, while the volume of each of the first, second and third equilibrium chambers 60, 62, 64 easily changes based on the elastic deformation or displacement of the first, second and third elastic layers 56, 38 and 40, so as to absorb or accommodate a change in the pressure of the fluid in the pressure-receiving chamber 58.

In the present embodiment, the size, thickness and configuration of the first, second and third elastic layers 56, 38, 40 are suitably determined so that these layers 56, 38, 40 partially defining the first, second and third equilibrium chambers 60, 62, 64 have respective desired spring stiffness values. Namely, the spring stiffness value of the first equilibrium chamber 60 is larger than that of the second equilibrium chamber 62 and is smaller than that of the third equilibrium chamber 64. The term "spring stiffness" used herein means an amount of change in the pressure of the fluid required to change the volume of each equilibrium chamber 60, 62, 64 by a predetermined amount. The assembling of the orifice member 44 and the outer sleeve 14 with the integral structure 12, 16, 20, 42 is effected within a mass of the non-compressible fluid, for example, so that the pressure-receiving chamber 58 and the first, second and third equilibrium chambers 60, 62, 64 are filled with the fluid.

The orifice member 44 has a through-hole 66 formed therethrough, and two grooves 68, 70 formed in its outer circumferential surface. These through-hole and grooves 66, 68, 70 generally extend in the circumferential direction over respective circumferential lengths and partially define a first, second and third orifice passage 72, 74, 76, respectively. The first orifice passage 72 connects the pressure-receiving chamber 58 and the first equilibrium chamber 60 with each other for fluid communication therebetween. The second orifice passage 74 connects the pressure-receiving chamber 58 and the second equilibrium chamber 62 with each other for fluid communication therebetween. The third orifice passage 76 connects the pressure-receiving chamber 58 and the third equilibrium chamber 64 with each other for fluid communication therebetween. Described more specifically, the through-hole 66 is formed through an axially intermediate portion of the bottom wall portion 54 of the first generally semi-cylindrical member 46, so as to extend straightly in the direction of extension of the bottom wall portion 54.

Figure 5:
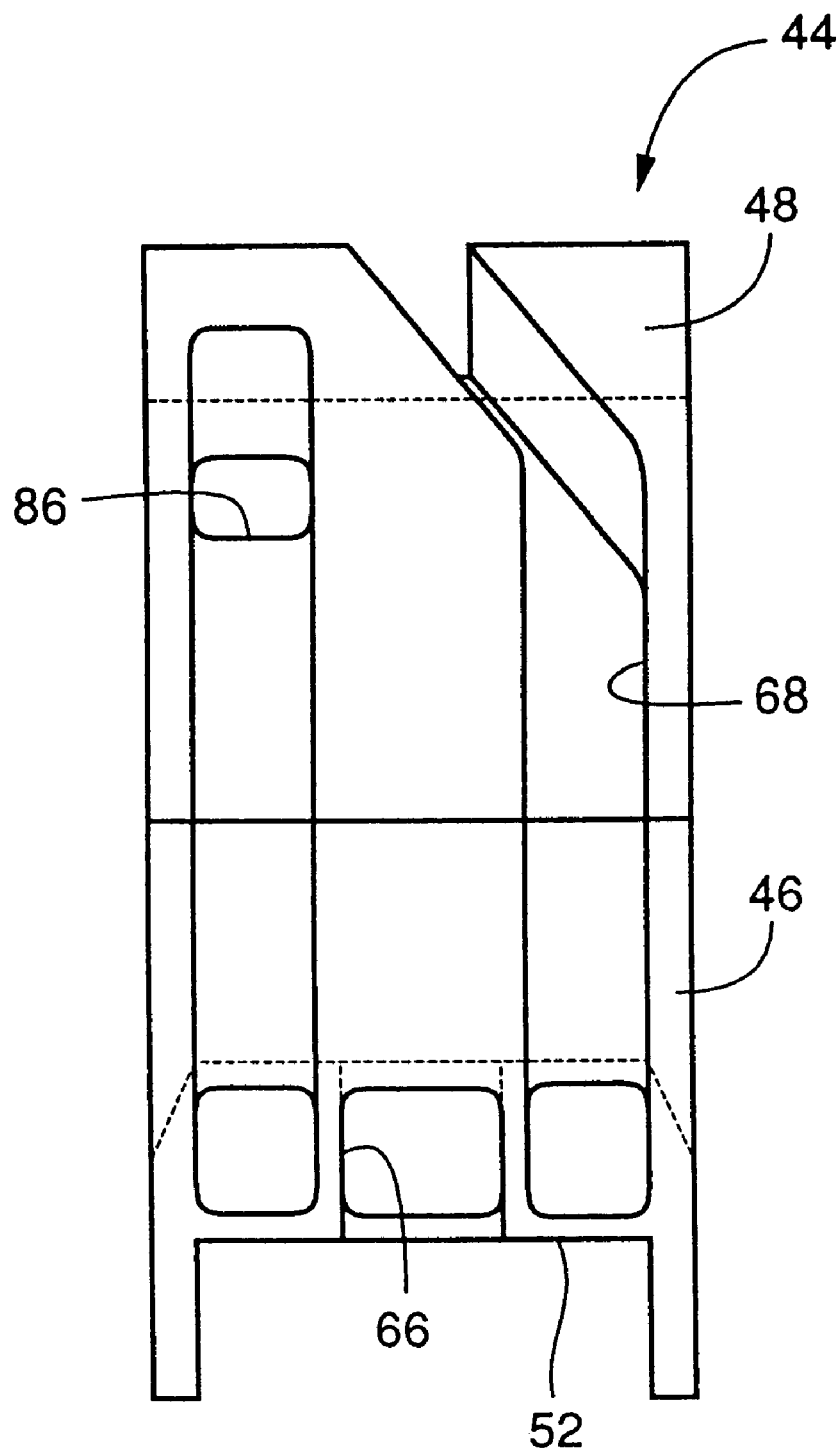
FIG. 5 is a left-side elevational view of the orifice member of FIG. 3.
Figure 6:
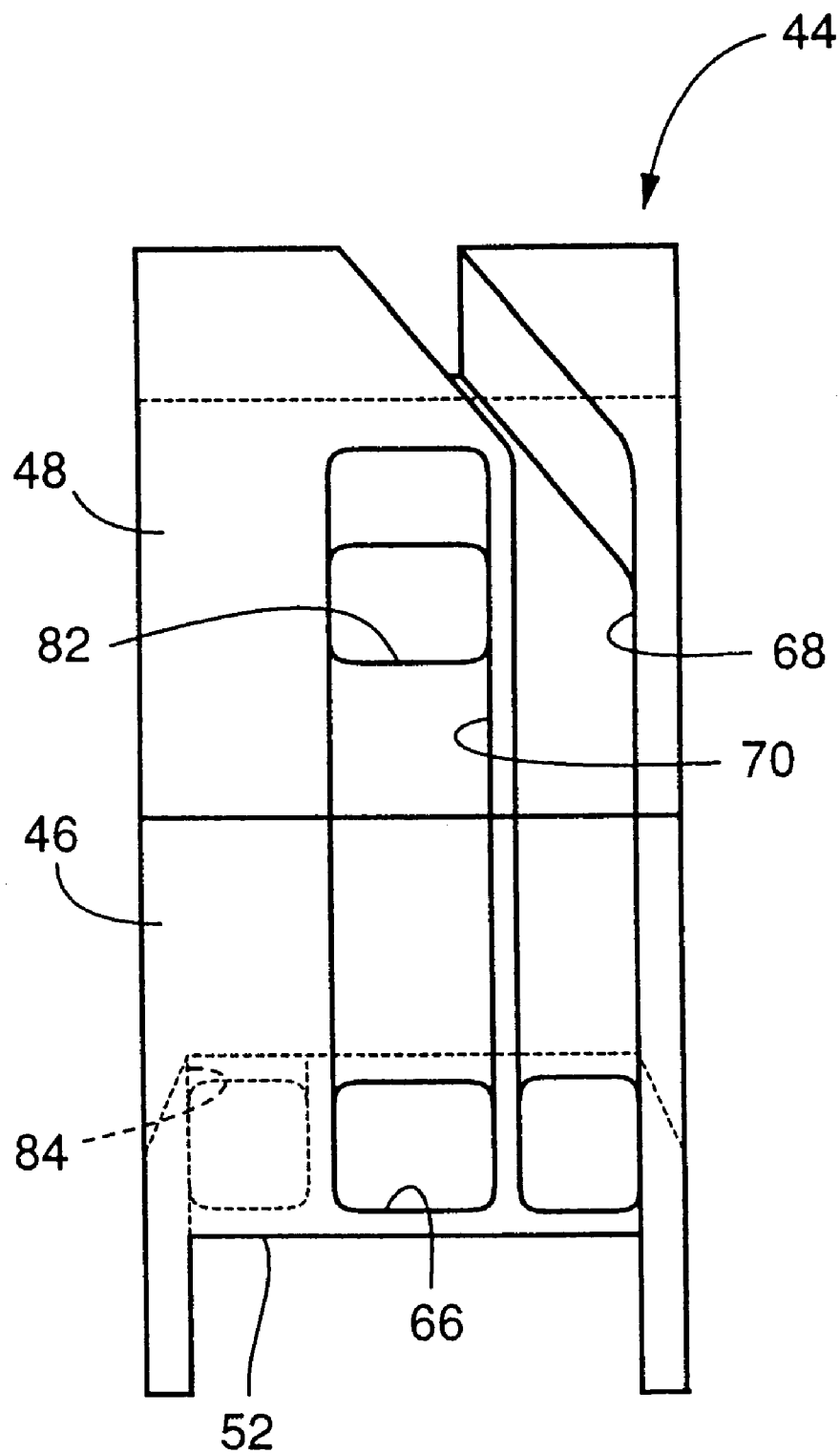
FIG. 6 is a right-side elevational view of the orifice member of FIG. 3.

The through-hole 66 communicates at its opposite ends with the pressure-receiving chamber 58 and the first equilibrium chamber 60 through a first communication hole 78 and a second communication hole 80, respectively, to thereby provide the first orifice passage 72 for fluid communication between the two chambers 58, 60. The third groove 70 extends from the end of the through-hole 66 on the side of the hole 78 in the circumferential direction of the orifice member 44 over a circumferential length substantially equal to a quarter of the circumference of the orifice member 44, such that the end of the third groove 70 is located in a portion of the second semi-cylindrical orifice member 48 aligned with the third pocket 34 (third equilibrium chamber 64). The third groove 70 has a rectangular shape in transverse cross section and is open in the outer circumferential surface of the orifice member 44. The third groove 70 communicates at its one end with the pressure-receiving chamber 58 through the first communication hole 78, and at its other end with the third equilibrium chamber 64 through a third communication hole 82 formed in the second semi-circumferential member 48 (FIG. 6). The opening of third groove 70 is fluid-tightly closed by the outer sleeve 14, to thereby provide the third orifice passage 76 for communication between the pressure chamber 58 and the third equilibrium chamber 64. The second groove 68 is formed in the first and second semi-cylindrical members 46, 48, so as to generally extend in the circumferential direction of the orifice member 44, over a circumferential length which is larger than the circumference of the orifice member 44. The second groove 68 communicates at its one end with the pressure receiving chamber 58 through a fourth communication hole 84 formed in the first semi-cylindrical member 46 (FIG. 6), and at its other end with the second equilibrium chamber 62 through a fifth communication hole 86 formed in the second semi-cylindrical member 48 (FIG. 5). The second groove 68 has a part extending through the bottom wall portion 54 of the member 46, and another part having a rectangular shape in transverse cross section and open in the outer circumferential surface of the members 46, 48. The opening of the U-shaped part of the second groove 68 is fluid-tightly closed by the outer sleeve 14, to thereby provide the second orifice passage 74 for communication between the pressure-receiving chamber 58 and the second equilibrium chamber 62.

In the present embodiment, the resonance frequencies of the fluid flowing through the first, second and third orifice passages 72, 74, 76 are easily tuned to the respective desired frequency bands, by adjusting the cross sectional areas and the lengths of the orifice passages 72, 74, 76, in view of the spring stiffness values of the elastic layers 56, 38, 40 of the first, second and third equilibrium chambers 60, 62, 64, which communicate with the pressure-receiving chambers 58 through the orifice passages 72, 74, 76, respectively, and in view of the density of the fluid contained within the engine mount 10. Described in detail, the ratio of the cross sectional area of fluid flow or communication to the length of the second orifice passage 74 is lower than that of the first orifice passage 72, and the ratio of the third orifice passage 76 is higher than that of the first orifice passage 72. Accordingly, the first, second and third orifice passages 72, 74, 76 exhibit an intended damping or isolating effect with respect to the input vibrations in different frequency bands, owing to the resonance of the fluid flowing through these orifice passages. For instance, the first orifice passage 72 is tuned so as to exhibit a low dynamic spring constant and an accordingly high vibration isolating effect with respect to medium-frequency vibrations within a band of about 20 Hz–50 Hz, such as engine idling vibrations, based on the resonance of the fluid flowing therethrough, while the second orifice passage 74 is tuned so as to exhibit a high damping effect with respect to low-frequency vibrations within a bands of about 10 Hz–15 Hz, such as engine shakes, on the basis of the resonance of the fluid flowing therethrough. The third orifice passage 76 is tuned so as to exhibit a low dynamic spring constant and an accordingly high vibration isolating effect with respect to high-frequency vibrations within a band of about 90 Hz–150 Hz, such as booming noise and higher harmonics of the engine idling vibrations, based on the resonance of the fluid flowing therethrough.

In the engine mount 10 constructed according to the present embodiment, the second and third equilibrium chambers 62, 64 are located in the upper circumferential portion of the engine mount 10, while the pressure-receiving and first equilibrium chambers 58, 60 are located in the lower circumferential portion of the engine mount 10 which is opposed to the upper circumferential portion in the diametric direction of the engine mount 10 parallel to the load-receiving direction indicated above. The second equilibrium chamber 62 is required to permit a large amount of change in its volume so as to exhibit a high vibration damping effect with respect to the low-frequency vibrations having a relatively large amplitude, while the third equilibrium chamber 64 is required to permit a comparatively small amount of change in its volume so as to exhibit an excellent vibration isolating effect with respect to the high-frequency vibrations having a relatively small amplitude. In the present embodiment, the second and third equilibrium chambers 62, 64 efficiently utilize or share the space in the upper circumferential portion of the engine mount 10 so that the second equilibrium chamber 62 permits a sufficiently large amount of change in its volume, to thereby exhibit a desired vibration isolating effect with respect to the low-frequency vibrations, while the third equilibrium chamber 64 exhibits a desired vibration isolating effect with respect to the high-frequency vibrations. Moreover, each of the second and third elastic layer 38, 40 partially defining the respective second and third equilibrium chambers 62, 64 can be given a relatively large axial length, since there is an open space at the axially opposite end portions of the engine mount 10. Further, the second and third elastic layers 38, 40 are provided by not only the bottom wall portions but also the axially opposite side wall portions (end wall portions) of the elastic body 16. The displacement of the inner sleeve 12 toward the pressure-receiving chamber 58 upon installation of the engine mount 10 on the vehicle, permits large amounts of displacement of the second and third elastic layers 38, 40 in the radially inward direction, since the amounts of displacement of the second and third elastic layers 38, 40 are not restricted by the inner sleeve 12. The above indicated arrangements assures that the volumes of the second and the third equilibrium chambers 62, 64 are variable by sufficiently large amounts.

In the engine mount 10, the first equilibrium chamber 60 which is capable to isolate the medium-frequency vibrations having a medium amplitude, is disposed in the lower circumferential portion of the engine mount 10, such that the first equilibrium chamber 60 is located radially outwardly of the pressure receiving chamber 58. Accordingly, the first equilibrium chamber 60 is efficiently formed so as not to restrict the amounts of change in the volumes of the second and third equilibrium chambers 62, 64. In other words, the first equilibrium chamber 60 is located in a radially outer part of the lower circumferential portion of the engine mount 10, which outer part cannot suitably used as a part of the pressure-receiving chamber 58, since the above-indicated radially outer part is not easily deformable owing to the elastic property of the elastic body 16 upon application of a vibrational load to the engine mount 10. That is, the first equilibrium chamber 60 does not considerably disturb the function of the pressure-receiving chamber 58. For effectively isolating the medium-frequency vibrations, the required amount of change in the volume of the first equilibrium chamber 60 is not so large as required in the second equilibrium chamber 62. That is, the required amount of change in the volume of the first equilibrium chamber 60 can be obtained although the chamber 60 is located in the space radially outward of the pressure-receiving chamber 58.

The engine mount 10 constructed as described above exhibits an excellent damping or isolating effect with respect to the input vibrations over a wide frequency range, on the basis of the resonance of the fluid flowing through the first, second and third orifice passages which are respectively tuned to the medium-, low- and high-frequencies, and which are respectively provided for fluid communication of the first, second and third equilibrium chambers 60, 62, 64 with the pressure-receiving chamber 58.

The spring stiffness value of the first elastic layer 56 of the first equilibrium chamber 60 is determined to be larger than that of the second elastic layer 38 of the second equilibrium chamber 62. When the engine mount 10 is installed on the vehicle, the weight of the power unit causes elastic deformation of the elastic body 16 and a consequent decrease of the volume of the pressure-receiving chamber 58, which causes the flow of the fluid from the pressure-receiving chamber 58 into the second equilibrium chamber 62. That is, the decrease in the volume of the pressure-receiving chamber 58 is compensated by an increase in the volume of the second equilibrium chamber 62 whose elastic layer 38 has a relatively small spring stiffness value as indicated above. This arrangement effectively decreases or eliminates an unfavorable increase of the pressure of the fluid in the pressure-receiving chamber 58 and the first, second and third equilibrium chambers 60, 62, 64, assuring an intended vibration damping or isolating effect of the engine mount 10. In this respect, the amount of displacement of the second elastic layer 38 of the second equilibrium chamber 62 is larger than that of the first elastic layer 56 of the first equilibrium chamber 60, since the amount of displacement of the first elastic layer 56 is restricted by the fixing bracket mounted on the outer circumferential surface of the outer sleeve 14. Thus, the increase of the pressure of the fluid in the pressure-receiving chamber 58 due to the decrease of the volume of the pressure-receiving chamber 58 is easily absorbed by the increase of the volume of the second equilibrium chamber 62, thereby preventing the problem of deterioration of the vibration isolating capacity of the first equilibrium chamber 60.

The portion of the elastic body 16 partially defining the pressure-receiving chamber 58 cooperates with the restricting member 42 bonded to the elastic body 16 to provide a vibration system whose natural frequency depends upon the elasticity of the elastic body 16 and the mass of the restricting member 42. The natural frequency of this vibration system is tuned to higher frequency vibrations whose frequency is higher than the resonance frequency of the fluid flowing through the third orifice passage 76, e.g., higher-frequency vibrations of about 250 Hz–350 Hz, such as a booming noise generated by a high-speed running of the vehicle on which the engine mount 10 is installed. In this arrangement, an unfavorable increase of the pressure of the fluid in the pressure-receiving chamber 58 can be reduced or eliminated on the basis of the resonance of the elastic body 16 partially defining the pressure chamber 58, making it possible to prevent a considerable increase of the dynamic spring constant of the engine mount 10 with respect to such higher-frequency vibrations, which increase would occur, since substantially no flows of the fluid through the first, second and third orifice passages 72, 74, 76 take place when such higher-frequency vibrations are applied to the engine mount 10. Thus, the vibration isolating effect of the engine mount 10 is further improved.

In the engine mount 10 constructed as described above, the pressure-receiving chamber 58 and the first, second and third equilibrium chambers 60, 62, 64 are disposed with effective space utilization, leading to prevention of unfavorable increase of the size of the engine mount 10.

The orifice member 44 partially defines the first, second and third orifice passages 72, 74, 76, is utilized to provide a partition-wall in the form of the bottom wall portion 54, which separates the first equilibrium chamber 60 and the pressure-receiving chamber 58 from each other, assuring the reduced number of the required components and structural simplicity of the engine mount 10.

While the presently preferred embodiment of this invention has been described above in detail for the illustrative purpose only, it is to be understood that the present invention is not limited to the details of the illustrated embodiments, but may be otherwise embodied.

The present invention is primarily characterized by the arrangement of the pressure-receiving chamber 58, and the first, second and third equilibrium chambers 60, 62, 64. The size of each of the pressure-receiving chamber 58 and the first, second and third equilibrium chambers 60, 62, 64, and their sizes relative to each other are not limited to those of the illustrated embodiments, but may be suitably determined depending upon the required vibration damping or isolating characteristics of the mount.

The cross sectional area, length and configuration of each of the first, second and third orifice passages 72, 74, 76 may also be suitably determined depending upon the required vibration damping or isolating characteristics of the mount.

The restricting member 42 disposed in the radially intermediate portion of the elastic body 16 is not an essential component of the engine mount 10. In place of or in addition to the restricting member 42, there may be employed a flow restrictor member which is supported by the inner sleeve member 12 and which radially outwardly protrudes from the inner sleeve member 12 into the pressure-receiving chamber 58 through the elastic body 16. The flow restrictor member has, at its end remote from the inner sleeve member 12, a plate-like or disc-like portion extending in the direction perpendicular to the load-receiving direction. The circumferential surface of this plate-like portion and the inner surface of the pressure-receiving chamber 58 cooperate with each other to define therebetween an annular fluid passage. On the basis of flows of the fluid through this annular fluid passage, input vibrations whose frequency is higher than the resonance frequency of the fluid flowing through the third orifice passage 76 can be effectively isolated, resulting in a further improvement in the vibration isolating effect of the mount.

In the above-described preferred embodiment, the present invention is applied to an engine mount for an automotive vehicle. The present invention is suitably applicable to the other mounts for the vehicle, such as a body mount, a differential mount, a suspension bushing, and a fluid-filled cylindrical mount used for various kinds of devices other than those used for the vehicle. Particularly, the present invention is applicable to a cylindrical mount in which a static load is not applied between the inner and outer sleeves upon installation of the mount to the device.

It is to be understood that the present invention may be embodied with various other changes, modifications and improvements, which may be occur to the skilled in the art, without departing from the spirit and scope of the invention defined in the attached claims.

EXAMPLE

Figure 7:
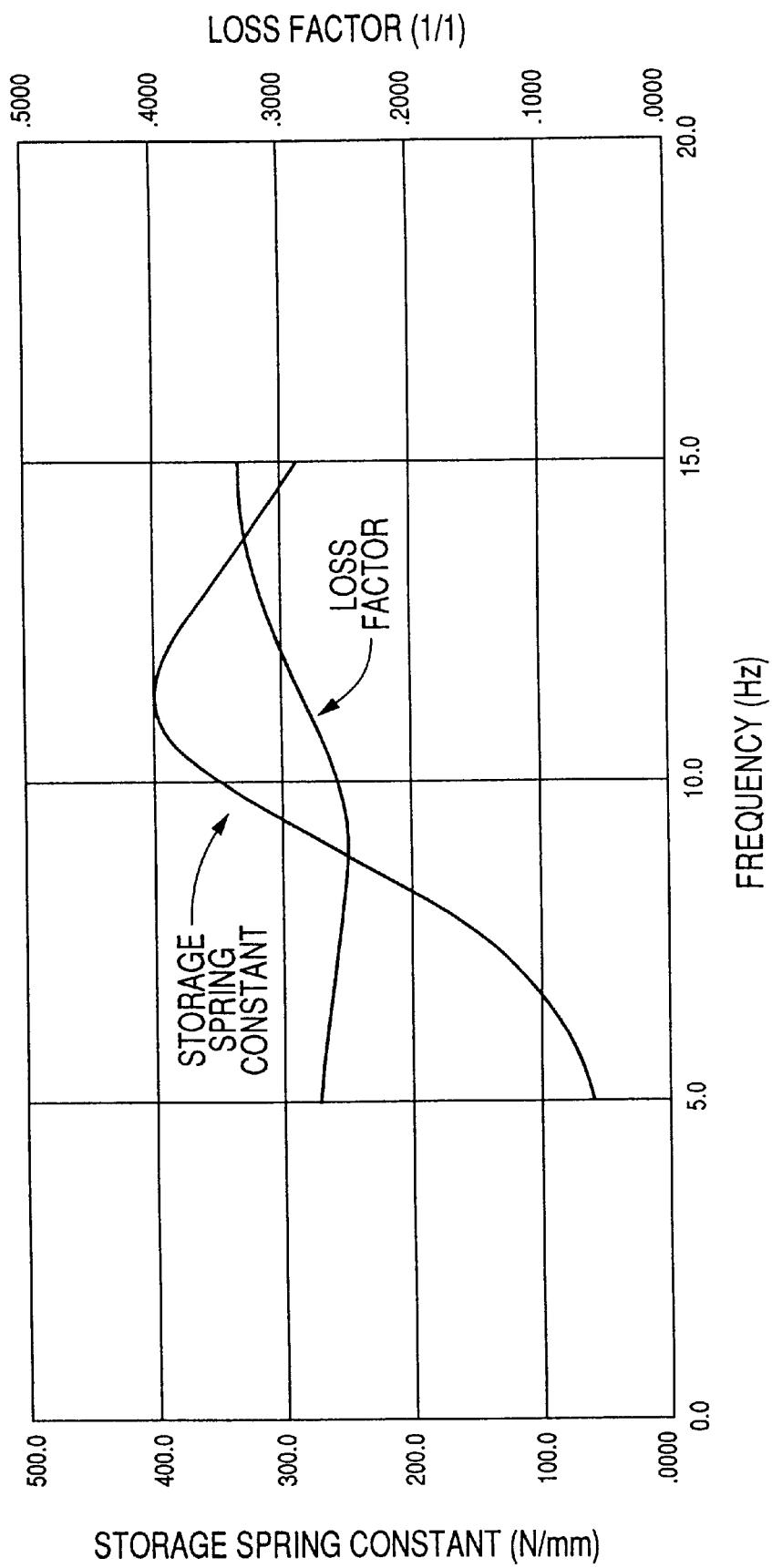
FIG. 7 is a graph showing a vibration damping characteristic of the engine mount of FIG. 1 with respect to a low-frequency vibration.
Figure 8:
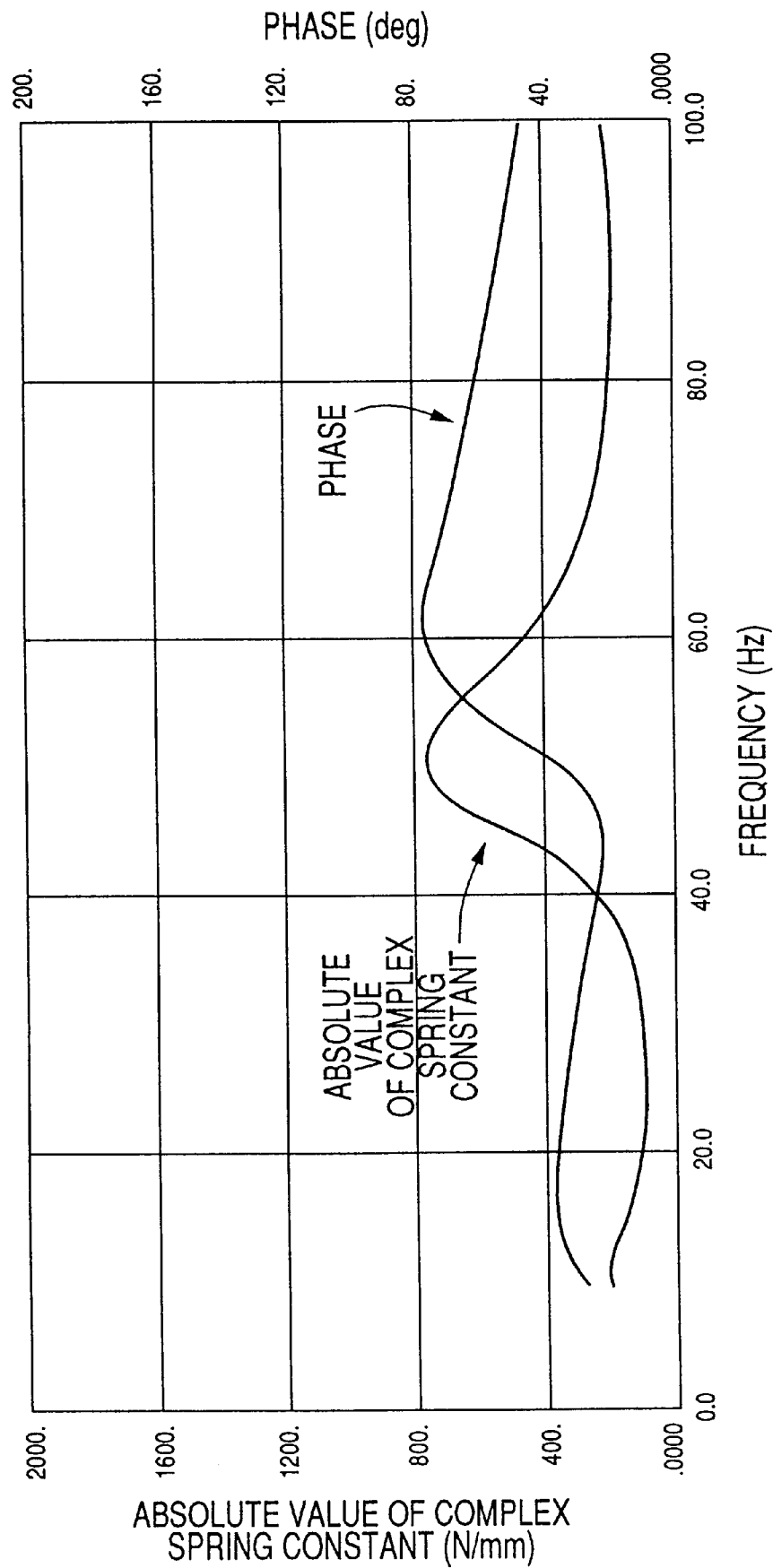
FIG. 8 is a graph showing a vibration isolating characteristic of the engine mount of FIG. 1 with respect to a medium-frequency vibration.

A specimen of the engine mount constructed according to the above-described embodiment of the present invention was prepared. The vibration damping and isolating characteristics of the specimen were measured with respect to low-frequency vibrations, medium-frequency vibrations and high-frequency vibrations. The damping characteristic with respect to the low-frequency vibrations is shown in the graph of FIG. 7, and the vibration isolating characteristics with respect to the medium- and high-frequency vibrations are respectively shown in the graphs of FIGS. 8 and 9. Each measurement was effected such that the engine mount specimen is subjected to a pre-load of 950.0 N as a static load. The vibration damping characteristic of the specimen with respect to the low-frequency vibrations was measured such that a vibration having an amplitude of 1.000 mm is applied between the inner and outer sleeves of the engine mount, while changing the frequency. The storage spring constant and the loss factor were measured. The vibration isolating characteristics of the specimen with respect to the medium- and high frequency vibrations were measured such that vibrations having an amplitude of 0.050 mm are applied between the inner and outer sleeves of the engine mount specimen, while changing the frequencies. The absolute value of complex spring constant and the phase difference were measured.

Figure 9:
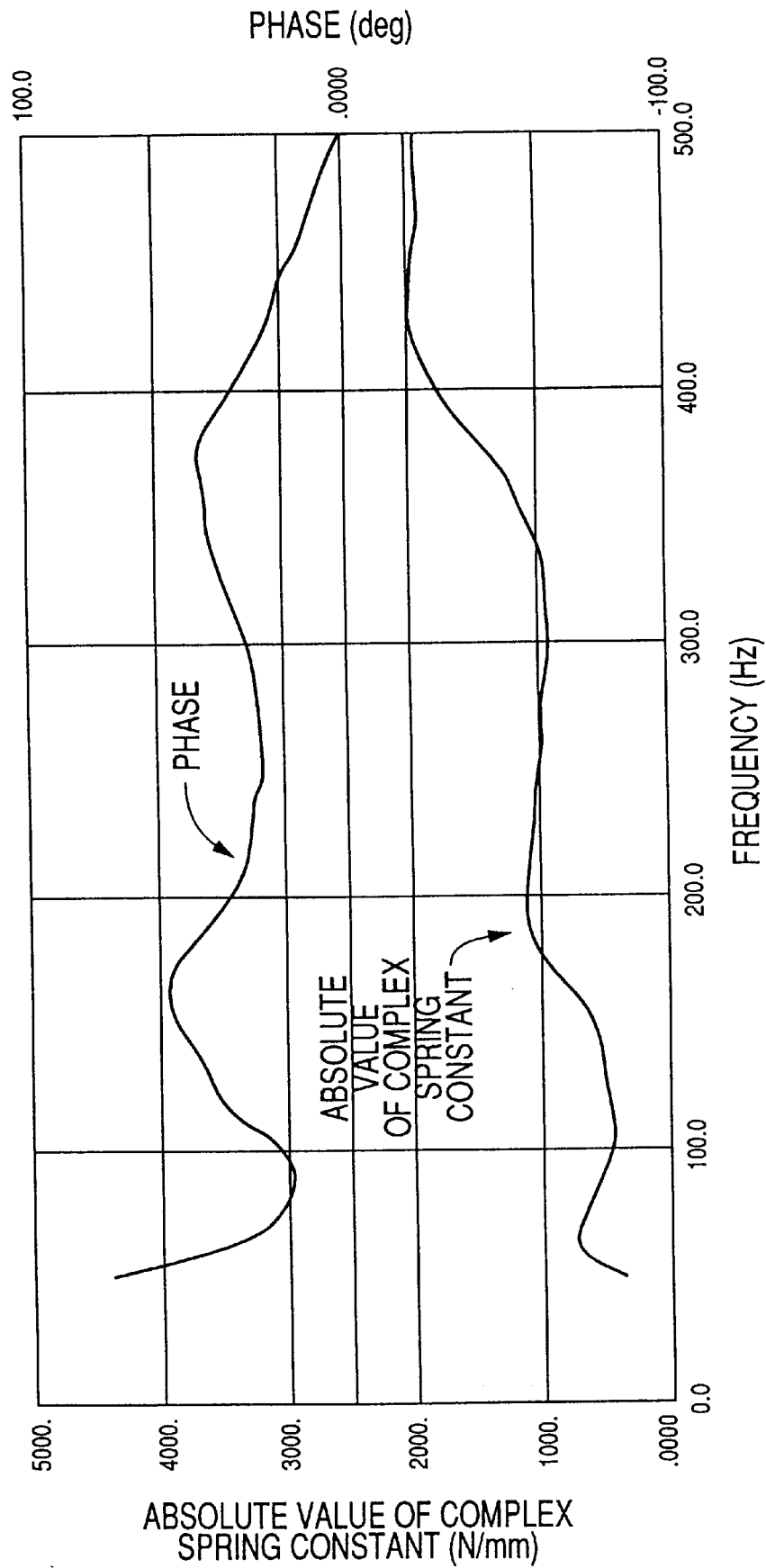
FIG. 9 is a graph showing a vibration isolating characteristic of the engine mount of FIG. 1 with respect to a high-frequency vibration.

As is apparent from the measurement shown in the graph of FIG. 7, the engine mount specimen exhibited a high vibration damping effect with respect to the low-frequency vibrations over a frequency band of 10 Hz–15 Hz, such as the engine shake. As is apparent from the measurement shown in the graph of FIG. 8, the engine mount specimen exhibited a low spring constant and an according high consequent excellent vibration isolating effect with respect to the medium-frequency vibrations over a frequency band of about 20 Hz–50 Hz, such as the engine idling vibration. Further, as is apparent from the measurement as shown in the graph of FIG. 9, the engine mount specimen exhibited a low spring constant and an accordingly high vibration isolating effect with respect to the high-frequency vibrations over a frequency band of about 90 Hz–150 Hz, such as the booming noise and the higher harmonics of the engine idling vibration. The measurement shown in the graph of FIG. 9 also reveals that the engine mount specimen also exhibited a low spring constant and a high vibration isolating effect with respect to the high-frequency vibrations over a frequency band of about 250 Hz–350 Hz, such as the booming noise generated during running of the vehicle at a high speed.

A technical study of the engine mount specimen by the present inventor revealed that the vibration damping effect with respect to the low-frequency vibrations was provided on the basis of the flows of the fluid through the second orifice passage 74, and that the low-spring constants with respect to the medium- and high-frequency vibrations were obtained on the basis of the flows of the fluid through the respective first and third orifice passages 72, 76. The technical study confirmed high stability of the first, second and third orifice passages 72, 74, 76 in their vibration damping and isolating effects based on the resonance of the fluid flowing the passages 72, 74, 76, with respect to the predetermined frequency bands to which these passages 72, 74, 76 were respectively tuned. It was further confirmed that the low spring constant of the mount with respect to the higher-frequency vibrations such as the booming noise was obtained on the basis of the resonance of the elastic body 16 to which the restricting member 42 is bonded.

As is apparent from the foregoing explanation, the fluid filled cylindrical elastic mount constructed according to the present invention is formed with the first, second and third equilibrium chambers which are adapted to damp or isolate the respective medium-, low- and high-frequency vibrations, such that the second and third equilibrium chambers are located in one of the two diametrically opposite semi-cylindrical portions of the engine mount, while the pressure-receiving chamber is located in the outer semi-cylindrical portion. Further, the first equilibrium chamber is located radially outwardly of the pressure receiving chamber. This arrangement effectively and advantageously permits the required amounts of change in the volumes of the first, second and third equilibrium chambers, so that the amounts of fluid flowing through the first, second and third orifice passages can be made sufficiently large, upon application of the vibrations to the engine mount. Thus, the engine mount can exhibit excellent vibration damping and isolating effects on the basis of the resonance of the fluid flowing through the first, second and third orifice passages, with respect to the medium-, low- and high-frequency vibrations to which the first, second and third orifice passage are respectively tuned.

What is claimed is:

1. A fluid filled cylindrical elastic mount interposed between two members of a vibration system, comprising:
   a center shaft member attached to one of said two members of said vibration system;
   an intermediate sleeve disposed radially outwardly of said center shaft member with a predetermined radial spacing therebetween and having a first window, a second window smaller than said first window and a third window smaller than said second window, said first, second and third windows being spaced apart from one another in a circumferential direction of said intermediate sleeve;

an elastic body interposed between and elastically connecting said center shaft member and said intermediate sleeve, said elastic body having a first pocket, a second pocket and a third pocket which are open in an outer circumferential surface of said intermediate sleeve through said first, second and third windows of said intermediate sleeve, respectively, said first pocket being located in one of two diametrically opposed circumferential portions of said mount while said second and third pockets being located in the other circumferential portion;

an outer sleeve member radially outwardly disposed on and fixed to said intermediate sleeve, and attached to the other member of said vibration system;

a first flexible diaphragm closing said first pocket;

said elastic body having an axial void which is formed through a portion of said elastic body between said center shaft member and said second and third pockets, over an entire axial length of said elastic body and in a circumferential direction of said elastic body with a circumferential length of about a half of a circumference of said elastic body, such that a major portion of said elastic body is located in said one circumferential portion of said mount and such that bottom wall portions of said second and third pockets respectively provide a second flexible diaphragm having a spring stiffness value smaller than that of said first flexible diaphragm, and a third flexible diaphragm having a spring stiffness value larger than that of said first flexible diaphragm;

a generally cylindrical orifice member interposed between said intermediate sleeve and including a first circumferential portion which divides said first pocket into a radially inner pressure-receiving chamber partially defined by said elastic body and a radially outer first equilibrium chamber partially defined by said first flexible diaphragm, said orifice member further including a second circumferential portion closing said second pocket so as to provide a second equilibrium chamber partially defined by said second flexible diaphragm, and a third circumferential portion closing said third pocket so as to provide a third equilibrium chamber partially defined by said third flexible diaphragm, said orifice member cooperating with said outer sleeve member to define a first orifice passage for fluid communication between said pressure-receiving chamber and said first equilibrium chamber, a second orifice passage for a fluid communication between said pressure-receiving chamber and said second equilibrium and a third orifice passage for fluid communication between said pressure-receiving chamber and said third equilibrium chamber, a ratio of a cross sectional area to a circumferential length of said second orifice passage being lower than that of said first orifice passage, and a ratio of a cross sectional area to a circumferential length of said third orifice passage being higher than that of said first orifice passage; and a non-compressible fluid filling said pressure-receiving chamber and said first, second and third equilibrium chambers.

2. A fluid-filled cylindrical elastic mount according to claim 1, wherein said first orifice passage has a circumferential length which is smaller than that of said second orifice passage and is larger than that of said third orifice passage.

3. A fluid-filled cylindrical elastic mount according to claim 1, wherein said second orifice passage has a circumferential length which is larger than an outer circumference of said annular orifice member.

4. A fluid-filled cylindrical elastic mount according to claim 1, further comprising a sealing rubber layer which is bonded to an inner circumferential surface of said outer sleeve member, and compressed by and between said outer sleeve member and said intermediate sleeve, said sealing rubber layer including a portion aligned with said first window and spaced apart from said outer sleeve member in a radially inward direction of said mount, so as to provide said first flexible diaphragm.

5. A fluid-filled cylindrical elastic mount according to claim 4, wherein said outer sleeve member has a through-hole formed at a portion thereof adjacent to said first flexible diaphragm, said first flexible diaphragm being exposed to the atmosphere through said through-hole.

6. A fluid-filled cylindrical elastic mount according to claim 1, wherein said second and third pockets have respective axially opposite side wall portions which are easily elastically deformable and which partially define said second and third flexible diaphragms, respectively, said second and third flexible diaphragms consisting of said bottom wall portions and said axially opposite side wall portions of said respective second and third pockets.

7. A fluid-filled cylindrical elastic mount according to claim 1, further comprising a restricting mass member embedded in a portion of said elastic body which partially defines said first pocket.

8. A fluid-filled cylindrical elastic mount according to claim 1, wherein said first flexible diaphragm has a surface area smaller than that of said second flexible diaphragm and larger than that of said third flexible diaphragm.

9. A fluid-filled cylindrical elastic mount according to claim 1, wherein said orifice member consists of two generally semi-cylindrical members.

10. A fluid-filled cylindrical elastic mount according to claim 1, wherein said intermediate sleeve is radially inwardly recessed at an axially intermediate portion thereof so as to provide a small-diameter portion partially defining an annular recess, said first, second and third windows are formed in respective portions of said small diameter portion.

11. A fluid-filled cylindrical elastic mount according to claim 1, wherein said spring stiffness values of said first, second and third flexible diaphragm and said ratios of said cross sectional area to said circumferential length of said first, second and third orifice passages are determined such that low frequency vibrations of about 10–15 Hz are effectively damped based on resonance of the fluid flowing through said second orifice passage, and medium-frequency vibrations of about 20–50 Hz are effectively isolated based on resonance of the fluid flowing through said first orifice passage, while high-frequency vibrations of about 90–150 Hz are effectively isolated based on resonance of the fluid flowing through said third orifice passage.

* * * * *